United States Patent [19]

Ullner

[11] 4,322,803
[45] Mar. 30, 1982

[54] METHOD OF AND DEVICE FOR FORMING RAW RUBBER CHARGES

[75] Inventor: Klaus Ullner, Brunswick, Fed. Rep. of Germany

[73] Assignee: Buehler-Miag GmbH, Brunswick, Fed. Rep. of Germany

[21] Appl. No.: 133,131

[22] Filed: Mar. 24, 1980

[30] Foreign Application Priority Data

Mar. 31, 1979 [DE] Fed. Rep. of Germany ....... 2912937

[51] Int. Cl.³ ..................... G06F 15/46; G01G 13/24
[52] U.S. Cl. ....................................... 364/473; 83/73; 83/77; 177/1; 177/114; 241/34; 241/DIG. 31; 364/567
[58] Field of Search ............... 364/468, 469, 473, 567; 425/148; 264/40.4; 83/73, 77; 241/33–37, DIG. 30, DIG. 31; 177/1, 25, 50, 122, 123, 114, 119, 70

[56] References Cited

U.S. PATENT DOCUMENTS

| | | | |
|---|---|---|---|
| 3,993,148 | 11/1976 | Keser et al. | 83/77 X |
| 4,136,749 | 1/1979 | Di Rosa | 83/77 X |
| 4,137,976 | 2/1979 | Grayson, Jr. | 177/1 |
| 4,214,640 | 7/1980 | Di Rosa | 83/77 X |
| 4,222,448 | 9/1980 | Sunkle et al. | 177/1 |

Primary Examiner—Joseph F. Ruggiero
Attorney, Agent, or Firm—Michael J. Striker

[57] ABSTRACT

The method of forming accurate charges of rubber composed of different sorts of rubber includes the steps of preparing for each sort a series of bales stored in a ready to feed condition on separate storing conveyors, successively discharging the required number of whole bales from respective series onto a common intermediate feeding conveyor wherefrom the batches of whole bales are supplied via a switching intermediate feeding conveyor to a scaling conveyor of an automatic scale. Part of whole bales is selectively directed to a cutting machine where the bales are successively disintegrated into smaller pieces and distributed according to the rubber sorts on separate storing and dosing conveyors directed to a hopper above the scaling conveyor. The whole plant is controlled by a programmable computer including a comparison stage which compares the actual weight of whole bales with the required weight and feeds via the scale hopper the amount of small rubber pieces from each sort which balances the weight difference. The cutting action of bales of one sort can take place simultaneously with the weighing action of whole bales of the other sort.

11 Claims, 1 Drawing Figure

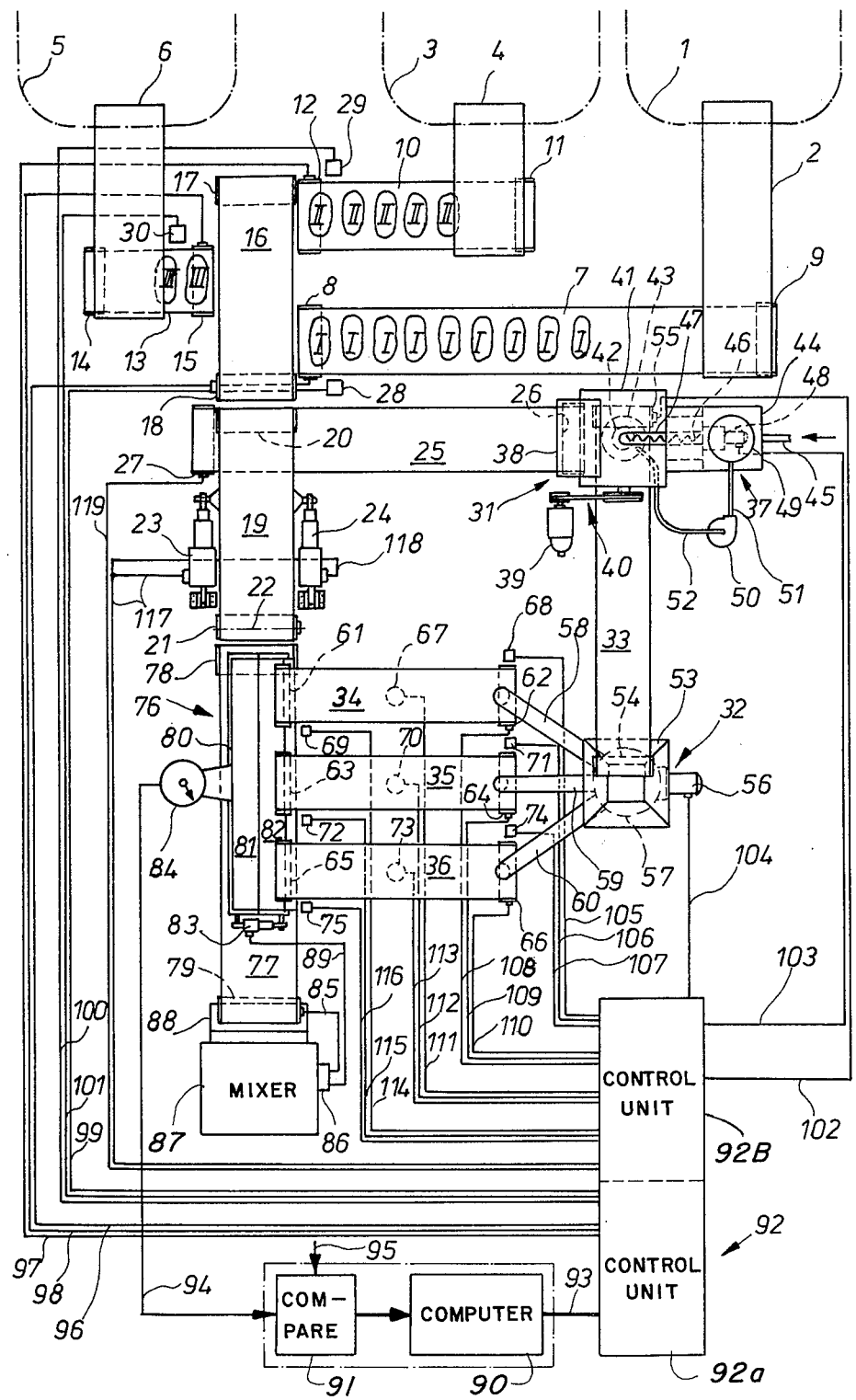

METHOD OF AND DEVICE FOR FORMING RAW RUBBER CHARGES

BACKGROUND OF THE INVENTION

The present invention relates in general to processing of raw rubber, and in particular to a method of and an automatic device for forming predetermined charges of at least one sort of raw rubber to be fed in a mixer used in the manufacture of rubber articles such as motor car tires and the like.

In manufacturing rubber articles such as tires the raw rubber charges for the mixer have to be formed within relative narrow tolerances, for example, charges containing 300 kilograms of constituents have to be made with a tolerance of ±2 kilograms. Each of such charges is constituted in accordance with a given prescription mostly by several sorts of synthetic rubber whereby each of the sorts forming the constituents of the charge has to be also measured within prescribed tolerances. In addition, for the preparation of a charge there is available only very short time interval inasmuch as the latter depends on the cycle of the subsequent mixer which amounts between 2.5 to 3 minutes only.

In practice, the actual raw rubber material employed as a starting material for the formation of the charges has the shape of rectangular rubber blocks or bales each having approximately 700 to 800 millimeters in length, 350 to 500 millimeters in width and 100 to 200 millimeters in height and a weight between 30 to 35 kilograms depending on the output of synthetic rubber plants. To meet the mixing prescription the charges in practice can never be formed of a number of whole rubber bales but it is necessary because of the desired amount of rubber components according to individual sorts and because of variations in the weight of the assorted bales to feed into the mixer also fractions of the bales Under these circumstances, considerable difficulties arise in forming a charge within the limits of the available short time interval.

In a known method of forming rubber charges the measurement of the raw rubber constitutents is carried out in such a manner that firstly an amount of raw rubber bales is brought on a scale where the number of bales in the batch is completed to a value which approaches as closely as possible to the desired weight of the component part or of the whole charge, thereupon in dependence upon the magnitude of the weight difference a piece or a disc is cut off from a rubber bale and thus the weight of the constituted part or of the charge is brought to the desired value. In this known method, therefore, each weight difference has to be converted into a length of a rubber bale which is to be separated from an additional bale and added to the charge or to a constituent part of the charge. Due to the fact however that the cross-section of respective rubber bales is not uniform, firstly because of different shape of the bales and secondly because of different dimensions of respective bales, such known method does not frequently meet the required accuracy in the weight of the charge but results in more or less large tolerances. In order to diminish this shortcoming it has been already devised to cut out the complementary fraction of a bale from an intermediate section of the latter where the relation between the length of a bale and its weight is more constant. Because of the fact, however, that the shape variations of respective rubber bales occur with equal frequency both with respect to the height and width and with respect to the length, this proposed measure brings about no general improvement in the accuracy of adjustment of desired weight of each charge or of its component parts.

From the German published patent application No. 28 39 53 a machine is known for performing the prior art charge forming method which includes a group of a first and of a second layer for feeding rubber bales or bale pieces to a first and to a second cutting device, and further includes a discharging conveyor which feeds pieces cut off from the cutting devices through an automatic scale; the first conveyor is arranged in a fixed position relative to the first cutting device whereas the second conveyor is movable relative to the second cutting device and the discharging conveyor is controlled by the automatic scale. This known machine, however, has also the disadvantages of the aforedescribed known method.

SUMMARY OF THE INVENTION

It is therefore a general object of this invention to overcome the aforementioned disadvantages.

More particularly, it is an object of the invention to provide an improved method of and a device for forming predetermined charges of at least one sort of raw rubber which enables a substantial increase in the accuracy of resulting charges.

Another object of this invention is to provide such an improved method and device which enables an accurate and automatic formation of raw rubber charges irrespective of the shape and uniformity of the supplied rubber bales.

In keeping with these objects and others which will become apparent hereafter, one feature of the invention resides, in the method of forming predetermined charges of rubber material, in the steps of (a) preparing and keeping in a ready to feed position a plurality of relatively large bales of respective sorts of rubber which are required in the mixing process, (b) preparing and keeping in a ready to feed condition a plurality of smaller pieces of the corresponding sorts of rubber, (c) separating from said plurality of layers a batch pertaining to one of said sorts required in one charge, (d) feeding the separated batch on a scale, (e) determining the weight difference between the actual weight of the batch and the desired weight for the one sort, (f) balancing the weight difference by said smaller pieces of the corresponding one sort, (g) repeating the steps (c) through (f) with the remaining sorts, and (h) feeding the completed charge to the mixer.

In order to store in a ready to feed condition a large amount of bales pertaining to each sort of rubber materials required in the mixing process, and at the same time to achieve a clear separation of respective raw rubber bales according to their sorts, a separate storing and conveying surface is assigned to each sort, and the bales are selectively withdrawn from respective conveyors when required.

According to another feature of this invention, a part of raw rubber bales from each sort is withdrawn from the storing and conveying areas and are separately disintegrated into smaller pieces whereupon the pieces pertaining to respective sorts are separately stored in a store wherefrom they are withdrawn when required. In storing the small pieces it is advisable especially if the rubber pieces are piled in higher layers to take care that the pieces do not reintegrate after a time period. For this reason, according to still another feature of this invention, the disintegrated rubber pieces are dusted with a separating agent such as for example kaolin or talcum powder, which provision takes place already during the chopping of the rubber bales. According to a further elaboration of the method of this invention, the small rubber pieces are fed to an automatic scale in response to the magnitude of the ascertained weight difference initially at a higher speed and subsequently at a lower speed so that a fine dosing of individual sort components could be achieved.

In addition, the device or plant for realizing the method of this invention has the following characteristic features:

(a) intake conveying means for individual sorts of rubber bales, (b) storing means for keeping in ready to feed condition the separate batches of whole bales from respective sorts required in one charge for the mixing process, (c) a device for disintegrating rubber bales from the employed sorts into smaller pieces and means for storing and discharging the separate amounts of smaller pieces according to individual sorts, (d) scaling device for weighing both the rubber bales and the rubber pieces and for determining the weight differences with respect to the desired weight of one rubber charge, (e) intermediate feeding conveyors for selectively feeding the batches of rubber bales from respective storing means to the disintegrating device or to the scaling device, (f) means for counting the amount of whole bales required for each charge, and (g) data processing and control means for activating the feeding action from respective storing means, the respective intermediate feeding conveyors and for feeding the amounts of small pieces from each sort in response to the measurements of the scaling device.

In further elaboration of the device of this invention the storing means for the whole rubber bales includes belt conveyors assigned to respective sorts of rubber bales and the intermediate feeding conveyors include a first or collecting conveyor cooperating with the storing conveyor to take over the successive batches of bales from the individual sorts and a switching conveyor adjoining the discharge end of the collecting conveyor to feed in one switching position the batches of respective sorts of whole bales to the storing device and in another position to give way to an underlying transverse feeding conveyor connecting the collecting conveyor with the crushing device and therefrom feeding the disintegrated rubber pieces to separate storing and dosing conveyors for the small pieces.

According to another feature of the device of this invention, the unit for chopping or disintegrating the rubber bales to produce smaller rubber pieces includes a motor driven cutting machine operating via a transfer conveyor with the distributor which in turn cooperates with as many storing and dosing conveyors as many sorts of raw rubber pieces are used. The disintegrating or cutting machine is also equipped with a device for supplying a separating agent such as kaolin or talcum powder for dusting the separated pieces at the outlet part of the separating machine. In order to insure the filling of the storing and dosing conveyor to a predetermined level of their storing capacity, each storing and dosing conveyor is provided with a monitoring system for checking the contents on the conveyor and cooperating with control means generating control signals indicative of the load of the storing conveyors and controlling the switching action of the intermediate feeding conveyors to supply requisite bales of respective rubber sorts to the crushing or disintegrating machine so that the storing and dosing conveyors for the small rubber pieces might be supplemented to their full capacity.

Preferably, the scaling device is of the type which simultaneously acts as a discharge conveyor to the mixer.

In accordance with another feature of this invention, the scaling device is a conveyor scale provided with a balancing container for receiving the smaller rubber pieces and being also provided with feelers generating signals corresponding to the actual weight and to the weight differences between the desired weight and the actual weight. The output of the feelers is either directly or indirectly connected to a computing processor which controls the actuation of respective feeding and storing conveyors as well as the operation of the disintegrating machine and of the distributor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates schematically in a plan view an example of an automatic unit for forming charges from three sorts of raw rubber for use in manufacturing motor vehicle tires.

DESCRIPTION OF THE PREFERRED EMBODIMENTS

The automatic device illustrated in the drawing produces raw rubber charges according to a predetermined prescription. For example, it is supposed to form charges of 300 kilograms each at a tolerance ±2 kilograms. Each charge further includes three sorts I, II and III of synthetic rubber whereby the proportion for each charge is 140 kilograms of sort I, 100 kilograms of sort II and 60 kilograms of sort III. The device or unit is constituted by seven basic functional groups, namely of supply means for feeding in relatively large rubber bales of the three different sorts of rubber, storing means for keeping the whole rubber bales in a ready to feed condition, a functional unit for crushing some of the of the three sorts to produce small rubber pieces and for storing as well as dosing these rubber pieces according to respective sorts; a scaling device both for the large rubber bails and for the smaller rubber pieces to weight up the charges; switchable intermediate feeding conveyors for feeding selectively large rubber bales from the storing conveyors to the crushing device or to the scaling device; a data processing unit with a corresponding system of feelers for ascertaining the number of the whole rubber bales which are required from each sort for a charge; and control means cooperating with the data processing computer to activate the crushing device, the intermediate feeding conveyors and the severing conveyors.

The intake supply of feeding conveyors are in the form of a circular conveyor for each of the three rubber sorts and transport the rubber bales from pallets at a preliminary store to a discharging apparatus which removes the rubber bales from the pallets and forwards the bales to corresponding storing conveyors for whole bales I, II and III. In this example, circular conveyors 1, 3 and 5 cooperate with discharge apparatuses 2, 4 and 6 to deliver respectively the rubber sorts I, II and III to bale storing conveyors 7, 10 and 13.

The bale storing conveyors 7, 10 and 13 are belt conveyors driven by driving drums 8, 12 and 15 and supported respectively on guiding drums 9, 11 and 14. All bale storing conveyors 7, 10 and 13 cooperate with a common first intermediate feeding conveyor 16 which also is in the form of a belt conveyor driven by an electromotor via a driving drum 18 and supported on a guiding drum 17. The discharge end of the first intermediate conveyor 16 cooperate with a second intermediate feeding conveyor 19 which is directed in alignment with feeding direction of the conveyor 16 and is inclinable by means of lifting devices 23 and 24 each controlled by an electromotor to adjust the conveyor 19 either in forwarding position in which it is flush with conveyor 16 or into a switching position in which the inlet end of conveyor 19 is lifted above the plane of the conveyor 16. In this switching position, the conveyor 16 discharges the bales on transversely directly additional feeding conveyors 25 located below the second intermediate conveyor 19 and cooperating with a cutting or disintegrating device 31. Both intermediate conveyors 19 and 25 are belt conveyors electromotorically driven by driving drums 20 and 27 and supported on guiding drums 22 and 26.

To control the amount of bales incoming on respective bales storing conveyors 7, 10 and 13 there are provided at the outlet of each bale storing conveyor, monitoring or counting devices such as for example electrically controlled signal generators or light barriers 28, 29 and 30 for counting separately the bale of sorts I, II and III discharged on the common first intermediate or feeding conveyor 16. As it will be explained below, the signals from the photoelectric counting devices are supplied to a data processor 92 which controls the activation of the conveyors.

The crushing or disintegrating machine 31 is a part of a subunit for producing and storing smaller rubber pieces and this subunit contains apart from the machine 31, a distributor 32, a conveyor 33 interconnecting the crushing machine with the distributor, three storing and dosing conveyor assigned to the outlets of the distributor, namely the conveyor 34, for rubber pieces of sort I, conveyor 35 for sort II and conveyor 36 for pieces of sort III, and a device 37 for applying a separating agent such as kaolin or talcum powder to the separated small rubber pieces.

The crushing or the disintegrating machine 31 is a conventional commercially available cutting mill including an intake tube 38, cooperating with the discharge end of the transverse feeding conveyor 25, and cutting blades at the discharge opening of the machine 31. A driving electromotor 39 continuously drives via a driving belt 40 the rotor provided with cutting blades. The housing 41 of the crushing machine 31 tapers downwardly into a discharge pipe 42 which is terminated with a collecting runner 43 arranged at a small spacing above the connecting conveyor 33.

The housing 41 of the crushing machine 31 includes also means 37 to supply a separating agent to the crushed rubber pieces. The means 37 includes a storing container 44 for the separating agent, a feeding conduit 45, a dosing worm conveyor 46 supported for rotation in a worm conveyor housing 47 and communicating with its discharge opening with the interior of the housing 41. The worm conveyor 46 is driven by a separate driving electromotor 48. The top of the storing container 44 for the separating agent is provided with a filter 49 and communicates with the outlet 51 of a suction blower 50. The suction inlet 52 of the blower 50 is connected to the interior of the collecting runner 43. The suction blower 50 is continuously driven by an electromotor and together with the filter 49 insures that the loose powdery separating agent is not discharged into the atmosphere and prevents the deposition of separating agent on the component parts of the unit.

The connecting conveyor 33 is an inclined conveyor which forwards the small rubber pieces from below from the outlet of the collecting shoe or runner 43 upwardly to the inlet funnel 53 of the distributor 32. Similarly as the other conveyors, the connecting conveyor is supported on guiding cylinder 54 and driven by an electromotor via the driving cylinder 55.

The distributor 32 is constructed in a conventional manner as a three-way flap distributor whereby the actuation of its distributing flaps is carried out by a conventional control drive 56. The housing 57 of the distributor 32 is provided with three outlet pipes 58, 59 and 60 the outlet openings of which face the intake ends of the storing and dosing conveyors 34, 35 and 36 for discharging thereon respective rubber sorts I, II and III.

The storing and dosing conveyors 34 through 36 are belt conveyors having a relatively large conveying surface which is dimensioned for reducing the height of the stored layers of rubber pieces because in the case of excessive height of the layer the danger may be arise that the pieces will stuck together. The storing conveyors 34, 35 and 36 are supported on guiding drums 61, 63 and 65 and on electromotorically driven driving drums 62, 64 and 66. The driving electromotors for the driving drums 62, 64 and 66 are switchable between two driving speeds so that the conveyors 34 through 36 can be initially driven at a higher speed, such as, for example, 0.2 meters per second, and subsequently at a lower speed such as, for example, 0.05 meters per second, depending on the feeding requirements for attaining a predetermined limit value of respective constituents I, II or III for the completion of one charge. For this purpose, each of the three storing and dosing conveyors 34 through 36 is provided with three monitoring signal generators. The first signal generators 67, 70 and 73 are conventional pressure feeler for determining the load on respective conveyors 34 through 36 and control the refilling of the latter with respective sorts of small rubber pieces when required; the second signal generators are preferably in the form of mechanical feelers or of proximity feelers which determine the storing condition on the conveyors and readiness for rerouting of the small rubber pieces from the distributor; and the third signal generators 69, 72 and 25 arranged at the discharge end of the conveyors 34 through 36 monitor the storing condition of respective conveyors after the rerouting; the latter signal generators can also be in the form of mechanical feelers or of proximity detectors.

The scaling device is in the form of conveyor scale 76 suitable for weighing batches of rubber bales and the complementary doses of small rubber pieces of respective sorts. The belt scale 76 is formed of a conventional weighing belt 77 continuously driven on guiding drums 78 and a driving drum 79 driven by an electromotor for receiving the batches of the whole rubber bales. For receiving the doses of smaller rubber pieces the scale 76 is provided with a scale container 80 which is situated above the upper run of the weighing conveyor band 77 at a clearance which is larger than the height of the rubber bales and is fixedly mounted on the frame of the scale. As seen from the FIGURE the three storing and dosing conveyors 34, 35 and 36 for small rubber pieces extend with their outlet ends over the edge of the scale container 80 to discharge immediately the required doses of the small pieces into the latter. The discharge opening at the bottom of the scale container 80 extends over the entire length of the latter and is closable by a closing apparatus including two flaps 81 and 82 which are controlled by an electromechanically driven control device 82 into an open or a closed position. The scaling conveyor 36 is equipped with a signal generating indicator 84 which is adjusted to a comparator and during the operation of the whole charge forming unit determines the weight of the batch of the whole rubber bales taking place on the scaling conveyor 76 and the weight of the subsequent doses of the smaller rubber pieces and optically indicate the weighing process on an indicator supervised by an attending person. The actual value indicator and signal generator 84 is also coupled to the process controlling computer 92 and will be explained below. The driving electromotor for the driving drum 79 of the scaling belt conveyor 76 is connected via electrical conduit 85 to a control circuit 86 of a mixer 87. The intake chute 88 of the mixer cooperates with the discharge end of the scaling conveyor 77. The control circuit 82 of the mixer is also connected by an electrical conduit 89 to the control apparatus 83 for the closing flaps 81 and 82. The electrical conduits 85 and 89 are multicore electrical cables.

The central control station for controlling the automatic operation of the whole charge forming unit of this invention includes a process controlling computer 90 such as for example as process controlling computer of IBM series/1 which includes a comparison stage 91 wherein the actual value signals from the actual value generator and indicator 84 are compared with desired values and converted into signals corresponding to the weight difference. The signal control station further includes a central control unit 92 coupled to the process controlling computer 90 by a strand of electrical conduits 93. The control unit 92 is composed of a control subunit 92a and a control subunit 92b each being formed of conventional signal converters and locking elements. Actual value signals from the signal generator and indicator 84 are fed into the comparison stage 91 via the conduit 94. The programmed signals corresponding to the desired weight values of the three rubber sorts I, II, and III per one charge are applied to the input 95 of the comparison stage. The control subunit 92a is connected by separate conduits 96, 97 and 98 to driving motors of respective bale storing conveyors 7, 10 and 13 and by electrical conduits 99 through 101 to monitoring signal generators 28, 29 and 30 located at the discharge ends of the storing conveyors. The other control subunit 92b is connected by electrical conduit 102 to the driving motor of the connecting conveyor 33, by a conduit 103 to the driving motor 48 of the device 37 for supplying separating agent, and by a conduit 104 to the control drive 56 for the distributor 32. Conduits 105, 106 and 107 connect monitoring signal generators 68, 71 and 74 at the receiving end of storing and dosing conveyors 34 through 36 for the small rubber pieces to the control subunit 92b. Electrical conduits 111 through 116 connect the remaining monitoring signal generators 67, 70, 73, 69, 72 and 75 to the control subunit 92b. Electrical conduits 117, and 118 connect the subunit 92b to the electrically controlled lifting devices 23 and 24 for lifting the intermediate feeding conveyor 19, whereas conduit 119 connects the subunit 92b to the driving motor of the intermediate feeding conveyor 25 to the crushing machine 31.

The above described system performs the charge forming operation according to this invention as follows:

At the start of the operation of the rubber charge unit, the bale storing means in the form of belt conveyors 7, 10 and 13 are loaded with respective rubber bales of the sorts I, II and III and at the same time the storing and dosing conveyors in the form of belt conveyors 34, 35 and 36 are loaded with layers of rubber pieces of the sorts I through III.

The process controlling computer 90 is programmed by the aforementioned weight values of respective components of one charge and of the total value of the charge as it has been described by way of an example previously. As soon as computer 90 receives signals from the monitoring signal generators assigned to belt conveyors 7, 10 and 13 and from the monitoring signal generators 68, 71 and 74 about the ready to feed condition as well as from the other non illustrated monitoring signal generators pertaining to other components of a charge such as carbon soot and other chemicals about a ready to feed condition of these initial components, the output of the computer 90 releases a start signal for initiating a cycle for forming a charge from the rubber sorts I through III required by the mixer 87.

According to the aforementioned programming of the process controlling computer 90 which according to the aforementioned example corresponds to a charge weight of 300 kilograms which includes 140 kilograms of the rubber sort I, the computer 90 now computes the required amount of the whole rubber bales of the sort I which are fed from the storing band conveyor 7 through intermediate feeding conveyors 16 and 19 to the scaling conveyor 77. If, for example, the maximum weight of respective bales of the sort I is 30 kilograms, the total number of whole bales from sort I for one charge results from the component of 140 kilograns divided by 30 kilograms equals 4.66, that means that there are required 4 whole rubber bales which upon activating the driving motor of the storing conveyor 7 in response to the signal from the control subunit 92b via conductor 96 are discharged on the first intermediate feeding conveyor 16. The monitoring signal generator 28 counts the bales I and transmits to the control unit 92 signals corresponding to the discharged bales. As soon as the amount computed by the computer 90 (that means 4 bales) is attained, the control subunit 92 deenergizes the driving motor the driving cylinder 8 and the feeding of the whole bales of the sort I is interrupted.

The intermediate feeding conveyors 16 and 19 operate continuously during the whole cycle of the charge forming unit and as mentioned above deliver the four bales I to the scaling band conveyor 77 of the scale 76. Upon settling of the scale 76 the latter ascertains the actual weight of the four whole rubber bales of sort I, which may be, for example, 117 kilograms and a signal corresponding to this actual weight is generated by the signal generator 84 which also indicates the actual weight on the indicator. The electric signal which is coded by the actual weight reading is applied via conduit 94 to the comparison stage 91 which compares the actual value of 117 kilograms with desired value (which for the sort I equals 140 kilograms) and the weight difference of 23 kilograms representing the previously computed remainder of 0.66 bail of sort I is again converted into a coded electrical signal and applied to the computer 90. The computer 90 thereupon instructs the control subunit 92b to switch on via conductor 108 the driving motor of the storing and dosing conveyor 34 which start discharging into the scale container 80 initially at a higher speed of about 0.2 meters per second the smaller rubber pieces of sort I while the actual value generator and indicator 84 continuously generates signals indicative of the increasing amount of the rubber component on the scaling container 76 and transmits these signals to the comparison stage 91 which in turn produces and delivers to the computer 90 a correspondingly diminishing weight difference signal. At a preset weight limit before reaching the required weight for example at 2 kilograms below the required weight, the computer 90 instructs the control unit 92 to switch over the electromotor of the driving cylinder 62 of conveyor 34 to switch over to a lower feeding speed of about 0.05 meters per second so that rubber pieces of the sort I are now fed into the scale container 80 at very fine doses. This fine dosing process takes place so long until the contents of the container 80 together with the four bails I present on the scaling conveyor 77 attain the desired or programmed weight of the constituent of sort I that is 140 kilograms. As soon as the balance is reached and the output signal from the actual value generator 84 equals the signal at the input 95 of the comparison stage 91, the latter releases an output signal through the computer 90 which in turn instructs on the basis of this output signal the control unit 92 to deenergize via other conductor 108 the driving motor of the storing and dosing conveyor 34. The feeding operation of the rubber material of the sort I is thus completed and the charge component 44 includes four whole rubber bales and the complementary dose of small rubber pieces taking place respectively, on the scaling conveyor 77 and in the scale container 80 of the scaling device 76.

Immediately upon the completion of the feeding operation for sort I, the processing computer 19 computes in the same manner according to the inserted program the requisite amount of whole rubber bales of sort II (100 kilograms divided by 30 kilograms equals 3.33) resulting in three whole bales II and in cooperation with the control unit 92 turns on via conductor 97 the electromotor of the bale storing conveyor 10 which starts discharging the whole rubber bales of sort II on the first intermediate conveyor 16. As in the preceding example, the signal generator 29 counts the discharged bales II and delivers a corresponding signal via conductor 100 to the control subunit 92a. As soon as the amount of three rubber bales II computed by the computer is signalled, the control unit disconnects the driving motor 12 of the conveyor 10 and the intermediate feeding conveyor 16 transfers the three whole bales of sort II via the second feeding conveyor 19 to the scaling conveyor 77 in addition to the present four bales of sort I. The conveyor scale 76 which operates by additive scaling, determines a new actual value (equalling to the actual value of sort I plus the actual weight of the three bales of sort II) by means of its measuring code generator 84 produces a new electrical signal corresponding to the new actual weight and applies this signal via conductor 94 to the comparison stage 91. At the same time, the signal generator and indicator 84 indicates the new actual weight to the attending personnel. The comparison station 91 compares again the new actual value with the corresponding desired value of the combined components parts of the charge under process that is the charge portion of sort I plus the charge portion of sort II equals 140 kilograms plus 100 kilograms equals 240 kilograms (and determines the actual weight difference of the sort II which may amount for example to 11 kilograms), i.e. 240 kilograms desired value minus for example 229 kilograms of the actual value.

The coded electrical signal corresponding to the difference value if applied into the computer 90 which instructs the control unit 92 to activate via conductor 109 the driving motor of the storing and dosing conveyor 35 which again discharges at a higher speed (0.2 meters per second) the small rubber pieces of sort II into the scale container 80 until the lower limit of 2 kilograms is reached. Upon attaining this lower limit the comparison stage 91 actuates computer 90 to instruct the control unit 92 to switch over to driving motor of the conveyor 35 to a lower speed (0.05 meters per second) so that the conveyor 35 now feeds the rubber pieces into the scale container 80 with very fine doses. Upon the reaching of the balance between the actual weight and the desired weight of 240 kilograms the signal from the scale signal generator 84 and the signal preset at the input of the comparison stage 91 are equal and under this condition they cause the release of an output signal from the stage 91 to the computer 90 which immediately causes via the control unit 92 the disconnection of the driving motor 64 of the conveyor 35 and consequently the filling operation for one charge of the small rubber pieces of the sort II is completed and the correct amount of the rubber material of the sort I as well as the correct amount of material of the sort II are ready on the conveyor scale 76.

In the same manner computer 90 starts the same computing in controlling operation with the last component part of the sort III which according to the prescribed program amounts to 60 kilograms and the corresponding number of whole rubber bales III 60 divided by 30 equals 2 are released by the bale storing conveyor 13 via the intermediate feeding conveyors 16 and 19 on the scaling conveyor 27 similarly as in the preceding component parts of the charge, the scale 72 determines by additive scaling operation a new actual value corresponding to the total value of the sorts I, II and III and the scale signal generator 34 delivers a corresponding coded signal to the comparison station 91 which compares the total actual weight of all three sorts of rubber material I-III with the desired weight of one charge (300 kilograms). If the measured combined weight is for example 298 kilograms the comparison stage generates an output signal corresponding to the difference of 2 kilograms and again activates via computer 90 the control unit 92 to switch on via conductor 110 the driving motor of the storing and dosing conveyor 36 for small rubber pieces. Since the missing weight amounts to 2 kilograms the conveyor 36 is now driven at the lower speed of 0.05 meters per second, to supply small rubber pieces of sort III into container 80 until the weight difference is balanced. When the total weight of the rubber load on scale 84 now reaches the required value 300 kilograms, the comparison stage 91 again instructs via computer 90 the control unit to stop the movement of the conveyor 36 and a complete charge of all rubber components I to III is complete and ready to be discharged into the mixer 87.

As soon as the control circuit 86 of the mixer 87 indicates that the latter needs a new charge, the driving electromotor of the scaling conveyor 77 is activated via the electrical conduit 85 and subsequently with a certain delay is activated via conduit 89 the control apparatus 83 to open the closing flaps 81 and 82 of the scale container 80. Small rubber pieces of all sorts I to III accumulated in the container 80 are now discharged on the scaling conveyor 77 and are discharged with the whole bales into the inner chute 88 of the mixer 87. A non-illustrated monitor is also arranged at the discharge end of the scale conveyor 77 which cooperates with the control circuit 86 of the mixer to monitor the feeding process into the mixer and as soon as this process is completed it generates a starting signal for the control circuit 86 to switch off the driving motor of the scaling conveyor 77 and via the control apparatus 83 to close the flaps 81 of the scale conveyor 80. At this moment, the conveyor scale 76 is again ready for receiving a new charge. Upon discharge of the load from the conveyor scale 76 the actual value generator and integrator 84 resets the zero indication and a corresponding zero weight signal is transmitted to the comparison station 91. This zero output signal instructs the computer 90 to initiate a new working cycle of the entire charge forming unit in accordance with the preset program whereby the above-described individual operations are repeated.

In the course of the repeated formation of the charges the loads of small rubber pieces stored on conveyors 34, 35 and 36 decrease and have to be continuously replenished that means the individual conveyors have to be reloaded with the corresponding sorts I through III of the small rubber pieces. Each of the storing conveyors 34 through 36 is dimensioned such as to be capable of storing rubber pieces corresponding to three whole rubber bales. The load monitoring signal generators 67, 70 and 73 assigned to the storing and dosing conveyors are adjusted so as to generate an output signal when the loads on the conveyor drops below a certain level for example below one-third of the storing capacity on the conveyor and this demand signal activates the discharging process from the distributor 32.

For example, if the store of rubber pieces of sort I decreases below the predetermined limit, the load monitoring signal generator 67 responds and transmits to the control subunit 92b a signal which activates the control unit 92 to perform the following three operations: (1) the control unit transmits via conductor 96 a signal to the driving member 8 to actuate the bale storing conveyor 7 for the sort I, thereupon via conductors 117 and 118 activates both lifting devices 23 and 24 to lift second intermediate feeding conveyor 19, and thereupon via conductor 108 activates the driving member of the conveyor 34. As a result the bale storing conveyor 7 discharges two whole rubber bales of sort I on the first intermediate feeding conveyor 16. The monitoring signal generator 28 at the discharging end of conveyor 7 again counts the discharged bales and control by means of its output signal transmitted via conduit 99 the control unit 92 which in turn upon passing of the second rubber bale switches off the driving member 8 of the conveyor 7.

The two lifting devices 23 and 24 angularly displace the conveyor 19 from its horizontal position to an inclined position in which the delivery of the whole bales from the first feeding conveyor 16 is switched over to the transverse feeding conveyor 25. Immediately upon the discharge of the two bales of sort I from the conveyor 16 on the conveyor 25, the inclined switching conveyor 19 is returned again into its horizontal position. For this purpose, the control unit 92 is adjusted to transmit with a certain time delay a command signal for lifting devices 23 and 24 to lower the conveyor 19 as soon as a signal from the monitoring generator 28 is transmitted via conductor 99 indicating that the additional rubber bales of sort I has been discharged. The two rubber bales are now cut into pieces in the chopping or disintegrating machine 31 and delivered by connecting conveyor 33 to the discharge pipe 58 pertaining to the sort I in the distributor 32.

The control subunit 92b switches on the driving member 62 of the storing and dosing conveyor 34 first in a reversed direction until downstream portion of the conveyor 34 which is still loaded by rubber pieces of sort I reaches the range of the upstream monitoring signal generator 68 which detects the residual load and delivers to the control unit 92 a signal which deenergizes the motor of the driving element 62 for the return movement of the conveyor 34 and via conductor 104, activates the control drive 56 of the distributor 32 which in turn adjusts the distributing flaps to deliver the cut pieces from the connecting conveyor 33 into the outlet pipe 58. Thereupon the control unit 92 actuates via conductor 102 the driving member 55 on the connecting conveyor 33 and via conductor 119 simultaneously the driving member 27 of the transverse feeding conveyor 25 which feeds both rubber bales of sort I to the disintegrating machine 31.

Simultaneously the control unit 92 activates three timing devices contained therein such as timing relays which upon the expiration of a time interval set by a first relay energizes the driving member 62 for driving the storing and dosing conveyor 34 in forward direction to replenish the load. The second timing relay is assigned to the driving member 27 of the transverse feeding conveyor 25 and upon expiration of its time setting switches off the driving motor of the member 27 so that after a preset time interval the feeding conveyor 25 is stopped. The third timing relay is assigned to the driving member 55 of the connecting member 33 and after a preset time interval deenergizes the driving motor 55 so that also the connecting conveyor 33 is stopped. The time settings of the three timing relays are adjusted such as to provide sufficient time for performing the respective feeding and distributing operations but on the other hand to terminate the idle motion of the machines and of the assigned conveyors before the latter are loaded with a different sort of rubber.

As mentioned above, the cutting or disintegrating machine 31 is continuously driven and its cutting blades disintegrate the two rubber bales I in a very short time. A non-illustrated monitoring element such as an ampermeter with built in limit value contacts monitors the increased power consumption of the electromotor 39 of the cutting machine 31 during its cutting operation and transmits to the control unit 92 a signal which causes the unit 92 to transmit via conduit 103 an actuation signal to the driving motor 48 of the device 37 for feeding the separation agent. The dosing worm conveyor 46 thus delivers from the container 44 the separating agent into the interior of the housing 41 of the cutting machine 31 and a fourth timing relay built in in the control unit 92 is actuated to switch off after the expiration of a preset timing interval the driving motor 48 so that the feeding of the separating agent into the machine 31 is interrupted.

To produce small pieces of rubber of sort I which have been dusted in the housing 41 by the separating agent and discharged through the outlet pipe 42 into the collecting runner 43 where superfluous separating agent is sucked off via conduit 52 into the suction blower 60; the rubber pieces thereupon reach the connecting conveyor 33 which transfers the same to the distributor 32 which as mentioned above, directs due to the proper setting of its distributing flaps the sort I rubber pieces to the outlet pipe 58 wherefrom they fall on the storing and dosing conveyor 34. Since the aforementioned first timing relay had switched on the motor of the driving member 62 for a forward movement at a low speed of the conveyor 34, the latter advances slowly the discharged rubber pieces in the direction toward the scale container 80 while new sort I rubber pieces are falling from the pipe 58. In this manner, conveyor 34 is progressively loaded with a new layer of rubber pieces and is in this manner brought in a ready to feed condition for the formation of the subsequent charges. In the course of the forward movement of the belt of the conveyor 34 corresponding to the increase of the sort I load, the layer of the rubber pieces reaches the range of the load monitoring signal generator 69 which transmits via conductor 144 a signal to the control unit 92 which causes the switching off of the driving member 62 of the conveyor 34 and consequently terminates the forward movement of the latter conveyor. At this instant the aforementioned second, third and fourth timing relays stop the movement of the conveyor 25, the operation of the device 37 for feeding the separating agent as well as the connecting conveyor 33. Accordingly, the working cycle for replenishing the storing conveyor 34 with smaller rubber pieces of sort I is completed.

Independently from the above-described reloading of the storing and dosing conveyor 34 the charge forming unit of this invention can simultaneously proceed in loading the scaling conveyor 77 with the two remaining rubber sorts II and III in response to the instructions from the process controlling computer 90 and consequently the charge forming process does not undergo during the production of the smaller rubber pieces any delay or interruption.

In the case when instead of the storing conveyor for small pieces of sort I the storing conveyors for rubber pieces of sorts II or III are to be replenished so the cutting, distributing and recharging operations take place in the same manner as described above in connection with the sort I.

In comparison with prior art processes the method of and device for this invention brings about the important advantage that the automatic formation of rubber charges is made fully independently from the dimensions and size of the rubber bales and that relatively low tolerances as well as substantially shorter processing times are achieved. Advantageous is also the feature of the system of this invention which enables that the bales of all sorts of rubber necessary for the formation of a charge are successively and separately processed and in ready to use condition according to respective sorts while eliminating the need of parallel operating piece cutting devices which otherwise would render the step too expensive.

It will be understood that each of the elements described above, or two or more together, may also find a useful application in other types of constructions differing from the types described above.

While the invention has been illustrated and described as embodied in a specific example of a system for forming rubber charges, it is not intended to be limited to the details as shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of forming predetermined charges of at least one sort of rubber to be discharged into a mixer, during the manufacture of rubber articles such as tires, comprising the steps of:
   (a) preparing and keeping in a ready to feed condition a series of relatively large bales of rubber for each sort used in the process;
   (b) preparing and keeping in a ready to feed condition a plurality of smaller pieces of rubber of respective sorts;
   (c) separating from said series of large bales a batch the total weight of which approaches a required weight for one charge;
   (d) transferring the separated batch onto a scale;
   (e) determining the weight difference between the actual weight of the batch and the desired weight of the latter;
   (f) balancing the weight difference by the addition of a requisite number of said smaller pieces of the corresponding sort of rubber;
   (g) repeating the steps (c) through (f) with the remaining sorts; and
   (h) feeding the completed charge into the mixer.

2. The method as defined in claim 1, wherein the rubber bales of each sort are stored on separate storing conveyors wherefrom the bales are discharged on a common intermediate feeding conveyor.

3. The method as defined in claim 2, wherein part of whole rubber bales of one sort is discharged on said common feeding conveyor, disintegrated into said smaller pieces whereupon it is distributed according to respective sorts and stored in a ready to feed condition on separate storing means.

4. The method as defined in claim 3, wherein during the disintegrating process of the large rubber bales the resulting smaller pieces are dusted with a separating agent which prevents reintegration of the small pieces.

5. The method as defined in claim 1 wherein in dependence on the magnitude of the weight difference the stored rubber pieces of respective sorts are first discharged on the scale at a higher and subsequently at a lower speed.

6. A system for an automatic formation of predetermined charges of at least one sort of rubber for use in the manufacture of rubber articles such as motor car tires, comprising:
   (a) means for supplying rubber bales of different sorts;
   (b) separate storing means for receiving respectively a succession of whole rubber bales of a sort and for keeping the succession in ready to feed condition;
   (c) a disintegrating device for cutting whole rubber bales into smaller rubber pieces and means for separately storing rubber pieces of respective sorts in a ready to feed condition;
   (d) a scaling device for the whole rubber bales and the rubber pieces;
   (e) a switchable intermediate feeding conveyor system for transferring selectively the whole rubber bales from said bale storing means to the scaling device or a part of the rubber bales to the disintegrating device and therefrom the resulting rubber pieces to the storing means;
   (f) a control system including a programmable process controlling computer and a plurality of sensors for determining and counting the amount of rubber bales; and
   (g) actuation means cooperating with said control system for activating the bale storing means, the rubber pieces storing means, the intermediate switchable feeding conveyors, the disintegrating device, and the scaling device in response to instructions received by said programable computer.

7. The system as defined in claim 6, wherein said supply includes circular conveyors and said bale storing means includes a belt conveyor assigned to each rubber sort and cooperating with said circular conveyor, said switchable intermediate feeding conveyor system including a first intermediate feeding conveyor cooperating with said bale storing belt conveyor to successively receive therefrom the prescribed batches of rubber bales a transverse intermediate feeding conveyor for connecting the discharge part of said first feeding conveyor to said disintegrating device and a switchable intermediate feeding conveyor selectively communicating with said common feeding conveyor for feeding the whole bales to said feeding device.

8. The system as defined in claim 6, further including a distributor having an input connected to the outlet from said disintegrating device by a connecting conveyor and having distributing outlets directed against respective storing means for individual sorts of said small rubber pieces.

9. The system as defined in claim 6, further including a device for feeding a separating agent into said disintegrating machine.

10. A system as defined in claim 8, wherein said control system also includes load monitoring feelers assigned to respective means for storing said small rubber pieces, said feelers cooperating with said actuating means to control the supply of the whole rubber bales of corresponding sorts to the disintegrating machine and a replenishing operation for said small piece storing means.

11. The system as defined in claim 6, wherein said scaling device is a conveyor scale having a conveyor belt communicating with said switchable feeding conveyor and a scale container arranged above said scaling conveyor and communicating with said storing means for the small rubber pieces, said scaling device further including a weight indicator and signal generator coupled to said computer via a comparison stage for comparing the actual weight of said scaling conveyor with a preset desired weight preprogrammed in said computer.

* * * * *